J. CAMPBELL.
BELLOWS-VALVES.

No. 182,355. Patented Sept. 19, 1876.

Witnesses
Geo. H. Strong
John L. Borne

Inventor
James Campbell
by Dewey & Co
Atty's

UNITED STATES PATENT OFFICE

JAMES CAMPBELL, OF SAN FRANCISCO, CALIFORNIA.

IMPROVEMENT IN BELLOWS-VALVES.

Specification forming part of Letters Patent No. 182,355, dated September 19, 1876; application filed February 10, 1876.

*To all whom it may concern:*

Be it known that I, JAMES CAMPBELL, of San Francisco city and county, State of California, have invented an Improved Bellows-Valve; and I do hereby declare the following description and accompanying drawings are sufficient to enable any person skilled in the art or science to which it most nearly appertains to make and use my said invention or improvement, without further invention or experiment.

The object of my invention is to provide a combined valve and valve-seat, which can be manufactured independent of the pipe or tuyere of a blacksmith's bellows, and which can be slipped into the pipe or tuyere so as to fit in it and form a partition across it, the valve being a portion of the partition.

The object of this valve is to prevent the gas from passing or being drawn from the fire into the bellows when it is not in action.

Figure 1:
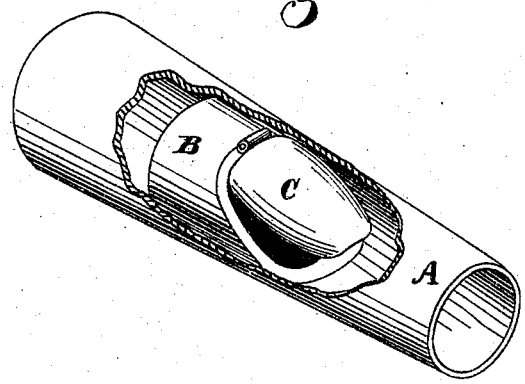
Figure 2:
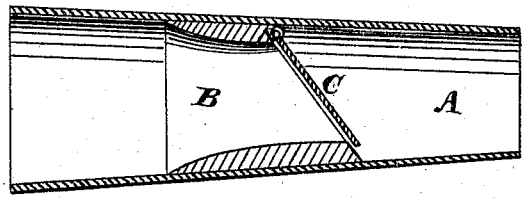

Referring to the accompanying drawing, forming a part of this specification, Figure 1 is a perspective view of a nozzle with my valve in place. Fig. 2 is a longitudinal section.

Let A represent the pipe or tuyere of a blacksmith's bellows. Let B represent a block of metal, which is of the proper size to slip into the pipe or nozzle A.

This block may be made of any desired length, but there is no necessity for making it any longer than is required to make it fit steady in the pipe or nozzle.

One face of this block is inclined in one direction and rounded or convex in the opposite or transverse direction, and a hole passes through it, as shown.

When placed in the pipe or tuyere, the projecting portion of the inclined face is at the bottom, while the receded portion is at the top of the pipe.

A clapper-valve, C, is hinged to the upper or receding edge of the front face, and this valve is curved to fit the curve of the face of the block or valve seat. When this block is introduced into the horizontal pipe or tuyere, the valve will close automatically by gravity, and make a tight joint, owing to the inclination of the front face; but it will not interfere with the blast from the bellows, as its rounded form will permit it to stand horizontally in the pipe and still conform to the shape of the interior of the pipe without materially diminishing the passage.

Tuyeres being usually tapering in form, I make the block B tapering also, so that it can be dropped into the large end of the tuyere and wedged tightly in place by a slight stroke, so that it cannot readily be displaced; but the tapering form is not necessary, as various means for fastening the block in the pipe could be used.

I thus avoid the expense of constructing the valve as a permanent part of the tuyere or pipe, and avoid the unsightly square enlargement heretofore employed to contain this valve.

My independent valve can be constructed quite cheaply, and applied to the nozzles now in use.

Having thus described my invention, what I claim, and desire to secure by Letters Patent, is—

A valve for the tuyeres and pipes of blacksmiths' bellows, composed of the block B, having its front face inclined in one direction and convex in a transverse direction, in combination with the hinged valve C, substantially as and for the purpose described.

JAMES CAMPBELL.

Witnesses:
GEO. H. STRONG,
JOHN L. BOONE.